(12) United States Patent
Gupta (10) Patent No.: US 9,628,475 B2
(45) Date of Patent: *Apr. 18, 2017

(54) USER AUTHENTICATION OF APPLICATIONS ON THIRD-PARTY DEVICES VIA USER DEVICES

(71) Applicant: Facebook, Inc., Menlo Park, CA (US)

(72) Inventor: Vikas Gupta, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 14/702,578

(22) Filed: May 1, 2015

(65) Prior Publication Data

US 2015/0237044 A1 Aug. 20, 2015

Related U.S. Application Data

(63) Continuation of application No. 13/534,977, filed on Jun. 27, 2012, now Pat. No. 9,055,050.

(51) Int. Cl.
*H04L 29/06* (2006.01)

(52) U.S. Cl.
CPC ...... *H04L 63/0853* (2013.01); *H04L 63/0876* (2013.01); *H04L 63/107* (2013.01)

(58) Field of Classification Search
CPC ..... H04L 63/00; H04L 63/08; H04L 63/0884; H04L 63/0892; H04L 63/10; H04L 67/02; H04L 67/16; H04L 67/20; H04L 67/28; H04L 67/32; G06F 21/30; G06F 21/31; G06F 21/34; G06F 21/44; G06F 21/60; G06F 21/62; G06F 21/6245; G06F 21/629; G06F 2221/2115; G06F 2221/2141; G06F 2221/2153

See application file for complete search history.

(56) References Cited

U.S. PATENT DOCUMENTS

| | | | |
|---|---|---|---|
| 6,804,786 B1* | 10/2004 | Chamley | G06F 21/34 235/380 |
| 2006/0174334 A1* | 8/2006 | Perlin | G06F 21/6218 726/9 |
| 2007/0230700 A1* | 10/2007 | Dekker | G06F 21/10 380/241 |
| 2008/0123843 A1* | 5/2008 | Machani | H04L 9/0822 380/44 |
| 2009/0199009 A1* | 8/2009 | Chia | H04L 63/0281 713/176 |

* cited by examiner

*Primary Examiner* — Eric W Shepperd
(74) *Attorney, Agent, or Firm* — Baker Botts L.L.P.

(57) ABSTRACT

In one embodiment, a first computing device receives an access token from a second computing device, the access token being generated by the second computing device for a specific software application executing on a specific computing device; stores the access token; receives a request for the access token from a software application executing on a third computing device; verifies whether the software application is the same as the specific software application and the third computing device is the same as the specific computing device for which the access token is generated; and sends the access token to the third computing device only when the software application is the same as the specific software application and the third computing device is the same as the specific computing device for which the access token is generated.

36 Claims, 4 Drawing Sheets

USER AUTHENTICATION OF APPLICATIONS ON THIRD-PARTY DEVICES VIA USER DEVICES

PRIORITY

This application is a continuation under 35 U.S.C. §120 of U.S. patent application Ser. No. 13/534,977, filed 27 Jun. 2012.

TECHNICAL FIELD

This disclosure generally relates to application authentication and more specifically relates to a user granting a specific application access to the user's information through the user's mobile device.

BACKGROUND

Some software applications, whether they are web based or desktop based, whether they are designed for mobile or stationary devices, may need to access information of their users in order to function properly. However, not all users may wish to grant every software application access to their information, especially their private information. Thus, a software application may need to request access to a user's information from the user before the user can use the software application.

DESCRIPTION OF EXAMPLE EMBODIMENTS

In particular embodiments, a first party may be associated with a first computing device and a second party may be associated with a second computing device. In particular embodiments, the first computing device and the second computing device are both mobile devices. There may be a software application executing on the second computing device. In order for the software application to perform some functions in connection with the first party, the first party may need to authenticate the software application and grant the software application access to some of the first party's information.

In particular embodiments, in order for the first party to authenticate the software application executing on the second computing device, the second computing device may send an application identifier (APP ID), which is uniquely assigned to the software application, and a device identifier (DEV ID), which is uniquely assigned to the second computing device, to the first computing device. In addition, the second computing device may send a set of permissions (PERMISSIONS) the software application requires from the user to the first computing device. The first computing device may ask the first party whether the first party is willing to grant the software application access to some or all of the first party's information, based on the set of access permissions the software application requires (i.e., PERMISSIONS). If the first party replies in the affirmative, then the first computing device may generate an access token using the software application's APP ID and the second computing device's DEV ID.

In particular embodiments, the first computing device may send the access token to a remote server, from where the second computing device may subsequently retrieve the access token. In this case, with some implementations, the access token is stored on the remote server and may be securely received by the second computing device. Alternatively, in particular embodiments, the first computing device may send the access token directly to the second computing device. Thereafter, with the access token, the software application executing on the second computing device may access the necessary information of the first party in order to perform appropriate functions in connection with the first party.

Social networking becomes increasingly popular, especially among younger generations, partly due to popular social-networking websites, such as "www.facebook.com", that has made social networking easy, fun, and trendy. With the advance of mobile technologies, users are able to share details of their daily life and activities with friends, families, and the general public whenever and wherever they choose. For example, if a user of a social-networking website is attending a social function, the user may wish to upload and post this information to his account at the social-networking website, even while he is at the social function, so that the information may be shared with his friends. If a user of the social-networking website is eating at a restaurant, the user may wish to post the information of the restaurant (e.g., name, address) and the items on the menu she orders to her account at the social-networking website. If a user of the social-networking website is watching television, he may wish to upload and post the information of the program he watches to his account at the social-networking website.

In particular embodiments, there may be software applications developed by third parties that perform various functions in connection with individual users of a social-networking website, such as helping users upload and post information to their respective accounts at the social-networking website. Often, these third parties may have relationships or be associated with the social-networking website. For example, when a user of the social-networking website is eating at a restaurant, the restaurant may have a software application executing on computing devices of the restaurant. The restaurant's software application may help the user upload menu items she orders to her account at the social-networking website. In this case, the restaurant is a third party, and the software application used by the restaurant is thus considered a third-party application.

In particular embodiments, sometimes, in order for a third-party application to perform functions in connection with or for a user of the social-networking website (e.g., uploading information to the user's account at the social-networking website for the user), the third-party application may need to obtain the user's permission or authentication before performing such functions. For example, the third-party application may need to know the user's account information (e.g., login and password) at the social-networking website in order to post information to the user's account. In some cases, the user may need to log into her account at the social-networking website through the third-party application in order for the third-party application to post information to the user's account.

Some users may feel uneasy giving out their private information (e.g., account access information) to third parties, especially if the users need to log into their accounts at the social-networking website through a third-party application executing on a third-party device. Other users may not wish to take the time to manually log into their accounts at the social-networking website through the third-party application executing on the third-party device.

Figure 1:
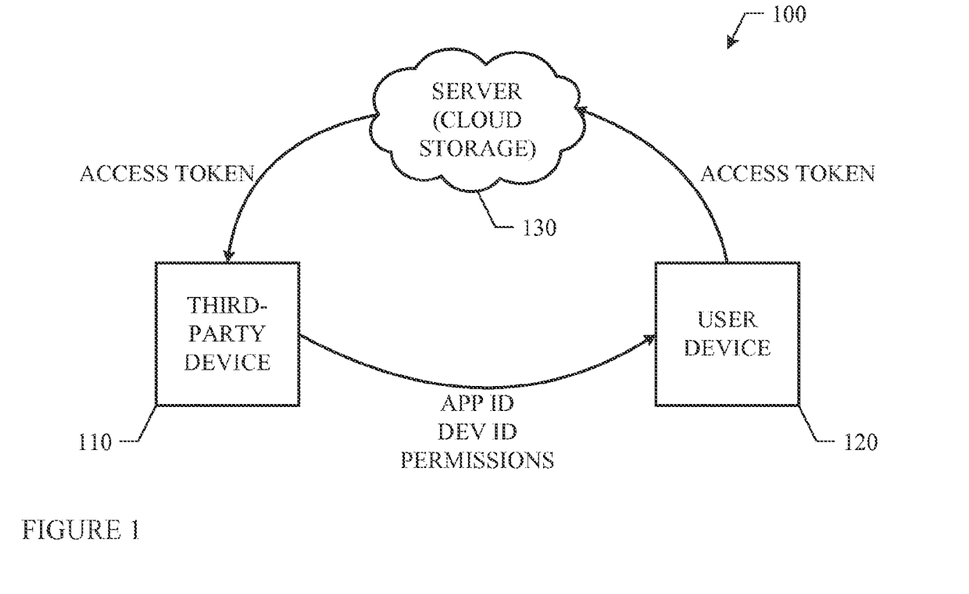
FIG. 1 illustrates an example system for a user to authenticate a software application.

FIG. 1 illustrates an example system 100 where a user may grant a third-party application executing on a third-party device access to the user's information without having to manually give the third-party application the necessary information.

In particular embodiments, a user device 120 is associated with a user. Similarly, a third-party device 110 is associated with a third party. There may be a third-party application executing on third-party device 110. In particular embodiments, user device 120 and third-party device 110 are both mobile devices (e.g., smartphone or tablet computer) and are capable of transmitting data via wireless communication connections. In particular embodiments, third-party device 110 may be a non-mobile device, such as a computer, a smart television, a kiosk, etc.

In particular embodiments, there is a one-way communication link from third-party device 110 to user device 120. Third-party device 110 may send data to user device 120 and user device 120 may receive data from third-party device 110 via this one-way communication link.

There are various ways for third-party device 110 to send data to user device 120. With some implementations, third-party device 110 may include a Radio-Frequency Identification (RFID) chip, and user device 120 may include a RFID reader. With some implementations, third-party device 110 may include a Near Field Communication (NFC) tag having a NFC chip, which is a specific type of RFID chip, and user device 120 may include a NFC reader. In both cases, user device 120 may obtain data from third-party device 110 when it is in close proximity with third-party device 110 such that the RFID or NFC reader of user device 120 may read the applicable information from the RFID chip or NFC tag of third-party device 110 (e.g., the applicable information is encoded or stored on the RFID chip or NFC tag). With some implementations, third-party device 110 may include a Quick Response Code (QR Code) (e.g., in the form of a sticker on third-party device 110), and user device 120 may include a QR Code reader. User device 120 may obtain data from third-party device 110 when it is in close proximity with third-party device 110 such that the QR Code reader of user device 120 may scan the QR Code to read the applicable information from the QR Code of third-party device 110 (e.g., the applicable information is encoded with the QR Code). With some implementations, third-party device 110 may send applicable information to user device 120 via a wireless communication link (e.g., using 802.11g protocol). With some implementations, a person associated with or representing the third party may manually input (e.g., typing) the applicable information into user device 120. In addition, with some implementations, the data may be formatted in a URL format that would launch the authentication flow in a browser on user device 120.

In particular embodiments, the third-party application executing on third-party device 110 may have a unique APP ID. That is, each different third-party application has a different APP ID. In addition, the third-party application may have a set of PERMISSIONS. In particular embodiments, third-party device 110 may have a unique DEV ID. That is, each different third-party device has a different DEV ID. Note that a third party may have any number of third-party applications and any number of third-party devices, and there may be any number of third-party applications executing on a third-party device. With some implementations, if third-party device 110 has a RFID chip, the identifier of the RFID chip (CHIP ID) may be used as the DEV ID of third-party device 110. With some implementations, if third-party device 110 has a NFC tag, the identifier of the NFC tag (TAG ID) may be used as the DEV ID of third-party device 110. With some implementations, the unique serial number of third-party device 110 may be used as the DEV ID of third-party device 110. With some implementations, a third-party application executing on third-party device 110 may assign a random unique DEV ID to third-party device 110.

In particular embodiments, third-party device 110 may send its DEV ID and the APP ID and PERMISSIONS of the third-party application executing on third-party device 110 to user device 120. PERMISSIONS indicate the type of access permissions the third-party application requests from the user in order to perform functions for or in connection with the user. With some implementations, if third-party device 110 has a NFC tag, the DEV ID, APP ID, and PERMISSIONS may be encoded or stored on the NFC tag. When user device 120 and third-party device 110 are brought into close proximity with each other, the NFC reader of user device 120 may read the DEV ID, APP ID, and PERMISSIONS from the NFC tag of the third-party device 110. With some implementations, the DEV ID, APP ID, and PERMISSIONS may be sent via a RFID connection. In this case, if third-party device 110 has a RFID chip, the DEV ID, APP ID, and PERMISSIONS may be encoded or stored on the RFID chip. When user device 120 and third-party device 110 are brought into close proximity with each other, the RFID reader of user device 120 may read the DEV ID, APP ID, and PERMISSIONS from the RFID chip of the third-party device 110. With some implementations, if third-party device 110 has a QR Code, the DEV ID, APP ID, and PERMISSIONS may be encoded with the QR Code. When user device 120 and third-party device 110 are brought into close proximity with each other, the QR Code reader of user device 120 may scan the QR Code to read the DEV ID, APP ID, and PERMISSIONS from the QR Code of the third-party device 110. With some implementations, third-party device 110 may send the DEV ID, APP ID, and PERMISSIONS to user device 120 via a wireless communication link with user device 120. With some implementations, a person associated with or representing the third party may manually input (e.g., typing) the DEV ID, APP ID, and PERMISSIONS into user device 120. With some implementations, the DEV ID, APP ID, and PERMISSIONS may be formatted in a Uniform Resource Locator (URL) format. Instead of the DEV ID, APP ID, and PERMISSIONS, this URL may be sent to user device 120 and user device 120 may then launch the browser to initiate the authentication flow for the APP ID requesting the PERMISSIONS. For example, in the case of RFID, NFC, or QR Code, the URL may be encoded in the RFID chip, NFC tag, or QR Code. The scanner in user device 120 may scan or read the URL, which then causes the URL to be launched in a browser to initiate the authentication flow.

In particular embodiments, user device 120, upon receiving the DEV ID, APP ID, and PERMISSIONS from third-party device 110, may ask the user whether she agrees to allow the third-party application to access some or all of her information in order to perform specific functions in connection with her or on her behalf. The user information the third-party application desires to access may be indicated by PERMISSIONS, and user device 120 may ask the user whether she agrees to grant the third-party application its requested PERMISSIONS. With some implementations, there may be a native application (e.g., provided by the social-networking website) executing on user device 120. Upon receiving the DEV ID, APP ID, and PERMISSIONS from third-party device 110, the native application may prompt the user for application permission. With some implementations, a web browser executing on user device 120 may be initiated upon receiving the DEV ID, APP ID, and PERMISSIONS from third-party device 110 to prompt the user for application permission.

If the user agrees, user device 120 may generate an access token based on the DEV ID, APP ID, and PERMISSIONS. For example, user device 120 may compute the access token using an applicable algorithm with the DEV ID, APP ID, and PERMISSIONS as input and the access token as output. In this case, the access token is uniquely generated for a specific third-party application having the APP ID executing on a specific third-party device having the DEV ID (e.g., third-party device 110) and encompassing the specific PERMISSIONS requested by the third-party application.

In particular embodiments, user device 120 may send the access token to a server 130. In particular embodiments, server 130 may be associated with the social-networking website and may be a part of a cloud storage. Server 130 may store the access token for the user. Thereafter, third-party device 110 may retrieve the access token from server 130 in order to perform the applicable functions for the user (e.g., retrieving information from or uploading and posting information to the user's account at the social-networking website using the access token). For example, to post information to the social-networking website on behalf of the user, the third-party application may make "POST" calls to a server associated with the social-networking website with the access token. To get information associated with the user from the social-networking website, the third-party application may make "GET" calls to a server associated with the social-networking website with the access token.

In particular embodiments, an Application Programming Interface (API) may be provided that enable third-party applications to retrieve specific access tokens from servers in the cloud storage. For example, a third-party application may send a request by making an API call to a server, in the form of "https://graph.fb/app_id/dev_id". Here, "graph.fb" may be a Uniform Resource Identifier (URI) of the server; "app_id" is the APP ID of the third-party application; and "dev_id" is the DEV ID of the third-party device on which the third-party application executes. The third-party application may repeatedly make the API call to the server (e.g., once every second) until it receives (e.g., pulls) the access token from the server.

In particular embodiments, servers (e.g., server 130) in the cloud storage may receive different access tokens sent from different user devices generated for different third-party devices and applications. The servers may protect these access tokens so that one third-party application executing on one third-party device does not obtain an access token generated for another third-party application executing on another third-party device. In particular embodiments, a third-party application also has a unique secret key (APP SECRET), in addition to its APP ID. Each third-party application's APP SECRET is private, known only to that third-party application and the servers. When a third-party application requests an access token from a server (e.g., server 130), the third-party application may generate an application token based on its own APP ID and APP SECRET. For example, the third-party application may compute the application token using an applicable algorithm with its APP ID and APP SECRET as input and the application token as output. The third-party application sends the generated application token to the server together with the request for the access token. The server verifies the third-party application using the application token, and sends the access token to the third-party application only if the third-party application is indeed the application for which the access token is generated. In particular embodiments, the access tokens stored in the cloud storage may be protected using timestamp, geo-location, Personal Identification Number (PIN), or any other applicable authentication means.

In FIG. 1, there is a one-way communication link from third-party device 110 to user device 120, which means data (e.g., APP ID, PERMISSIONS, and DEV ID) can only be sent from third-party device 110 to user device 120. Consequently, server 130 is needed to relay the access token generated by user device 120 to third-party device 110. Alternatively, in particular embodiments, there may be a two-way communication link between third-party device 110 and user device 120, such that data may be sent from third-party device 110 to user device 120 as well as from user device 120 to third-party device 110. In this case, server 130 may not be needed.

Figure 2:
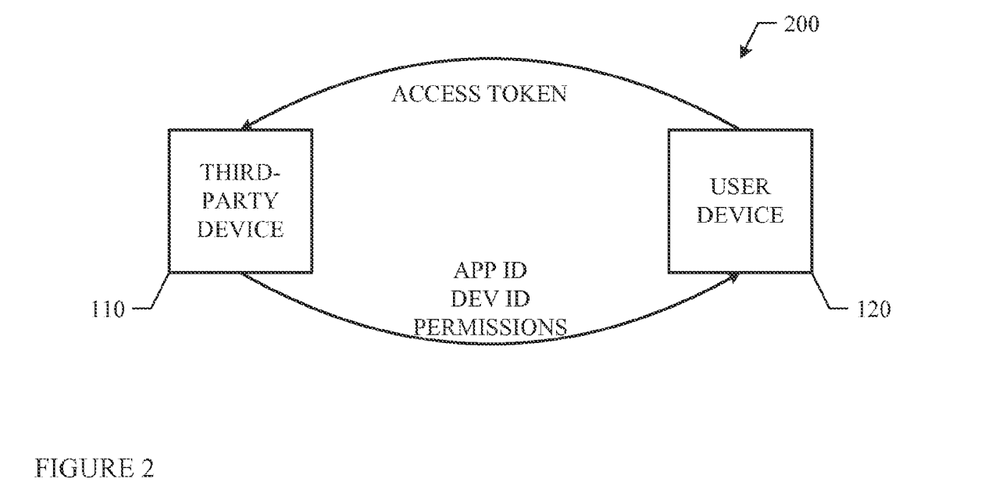
FIG. 2 illustrates an example system for a user to authenticate a software application.

FIG. 2 illustrates an example system 200, where there is a two-way communication link between third-party device 110 and user device 120. Similar to system 100 illustrated in FIG. 1, the DEV ID of third-party device 110 and the APP ID and PERMISSIONS of the third-party application executing on third-party device 110 may be sent from third-party device 110 to user device 120 using any applicable means. If the user grants the third-party application access to her information (e.g., as indicated by PERMISSIONS), user device 120 generates the access token based on the DEV ID, APP ID, and PERMISSIONS. However, unlike system 100, for system 200, user device 120 may send the access token directly to third-party device 110. With some implementations, user device 120 may include a NFC chip and third-party device 110 may include a NFC reader. The access token may be encoded on the NFC chip of user device 120. When user device 120 and third-party device 110 are brought into close proximity with each other, the NFC reader of third-party device 110 may read the access token from the NFC chip of user device 120. With some implementations, user device 120 may send the access token to third-party device 110 via a RFID connection. With some implementations, user device 120 may send the access token to third-party device 110 via a wireless communication link (e.g., using 802.11g). With some implementations, the user may manually input (e.g., typing) the access token into third-party device 110. Thereafter, third-party device 110 may use the access token to perform the applicable functions for the user (e.g., retrieving information from or uploading and posting information to the user's account at the social-networking website).

In both cases illustrated in FIGS. 1 and 2, a user does not need to give up her information (e.g., account access) to a third-party application executing on a third-party device (e.g., third-party device 110). Instead, the user may log into her account at the social-networking website using her own device (e.g., user device 120). The third-party application is given an access token to perform functions in connection with the user. In particular embodiments, each access token may have an expiration time (e.g., 30 minutes). Once the expiration time has passed, the access token becomes invalid. If the third-party application needs to perform further functions for the user, a new access token needs to be generated. This prevents the third-party application from keeping the access token indefinitely and performing potentially unauthorized functions in connection with the user. For example, when the user is eating at a restaurant and an access token is generated in order for the restaurant's application to post the user's order to the user's account at the social-networking website, once the user has finished ordering or the user has paid the bill or the user's order has been uploaded to the user's account at the social-networking website or a specific amount of time has passed, the access token may expire automatically. As another example, the restaurant's application may manually invalidate the access token.

Sometimes, it is possible for a user to interact with the same third-party multiple times. For example, the user may return to the same restaurant from time to time. In particular embodiments, once a user has granted access to a specific third-party application, the user's application permission choice may be stored in the user's account at the social-networking website or on the user's device (e.g., user device 120). Subsequently, when the same third-party application needs to perform similar functions for the user again, the user's device may not need to ask the user again whether the user is willing to grant that specific third-party application access to the user's information. Instead, the user's device may automatically generate an access token once it has received the APP ID, PERMISSIONS, and DEV ID from the third party's device (e.g., third-party device 110) on which the third-party application executes. If the user wishes to change his decision (e.g., deny the third-party application access to his information instead), the user may manually change the stored application permission for this third-party application (e.g., through the user's device). Sometimes, the third-party application may have new functionalities added to it that require a new, different set of PERMISSIONS. In this case, the user may be presented with the new PERMISSIONS the third-party application requests. Once the user grants the requested PERMISSIONS, a new access token may be generated based on the new PERMISSIONS, which may then be used by the third-party application to perform the appropriate functionalities.

Figure 3:
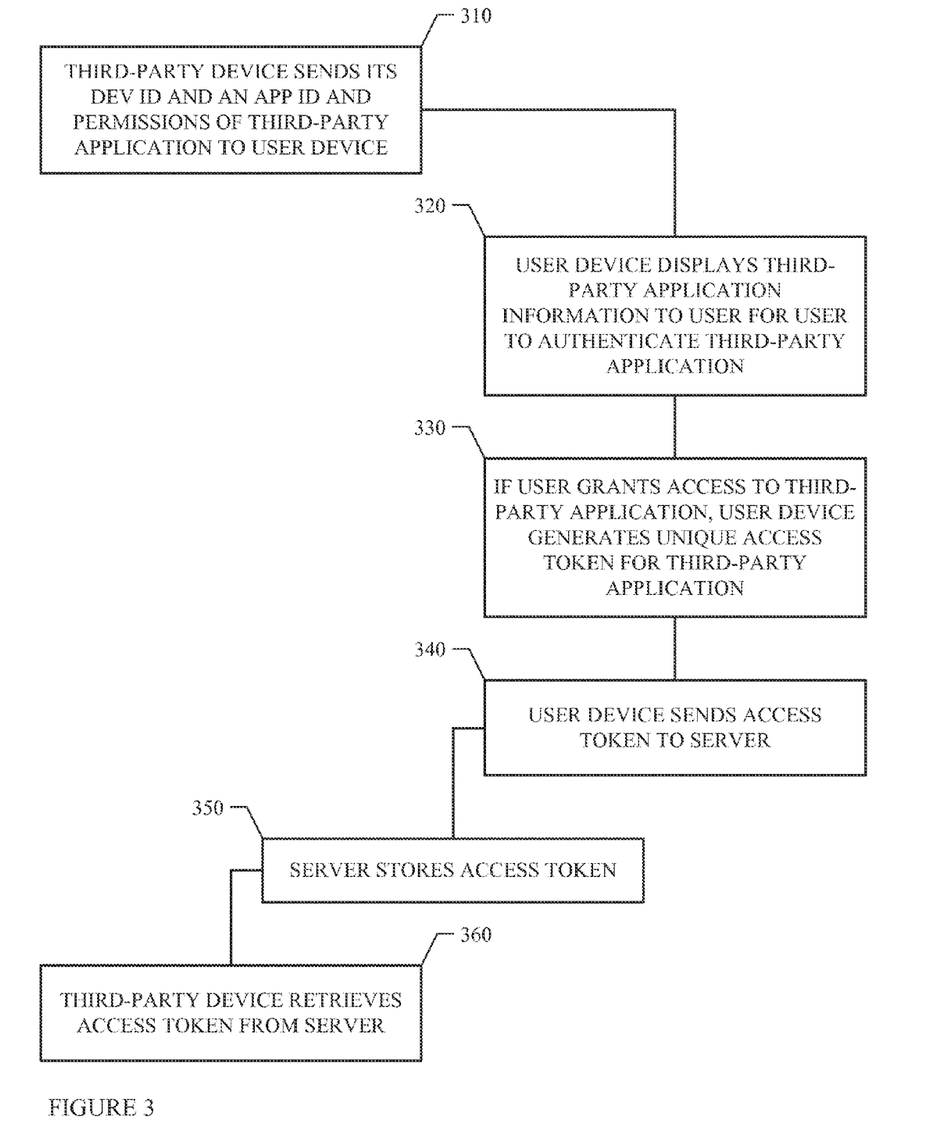
FIG. 3 illustrates an example method for a user to authenticate a software application.

FIG. 3 illustrates an example method for obtaining user permission for a third-party application executing on a third-party device, which corresponds to system 100 illustrated in FIG. 1. In particular embodiments, the method may start at step 310, where a third-party device sends its DEV ID and the APP ID and PERMISSIONS of a third-party application executing on the third-party device to a user device associated with a user. At step 320, the user device may check whether the user has already granted application permission for this specific third-party application, and if not, the user device may ask the user whether he is willing to grant this third-party application access to his information (e.g., as indicated by PERMISSIONS). If the user responds affirmatively (e.g., granting access), at step 330, the user device may generate an access token based on the DEV ID, APP ID, and PERMISSIONS. In particular embodiments, the user's application permission choice for this third-party application, whether affirmative (e.g., granting access) or negative (e.g., denying access), is stored for future reference. At 340, the user device sends the access token, if one is generated, to a server. At 350, the server stores the access token. At 360, the third-party application may retrieve the access token from the server. In particular embodiments, the server may verify the third-party application and send the access token to the third-party application only if the access token has been generated for this third-party application. The third-party application may then perform functions in connection with the user using the access token. The method may end at this point.

Figure 4:
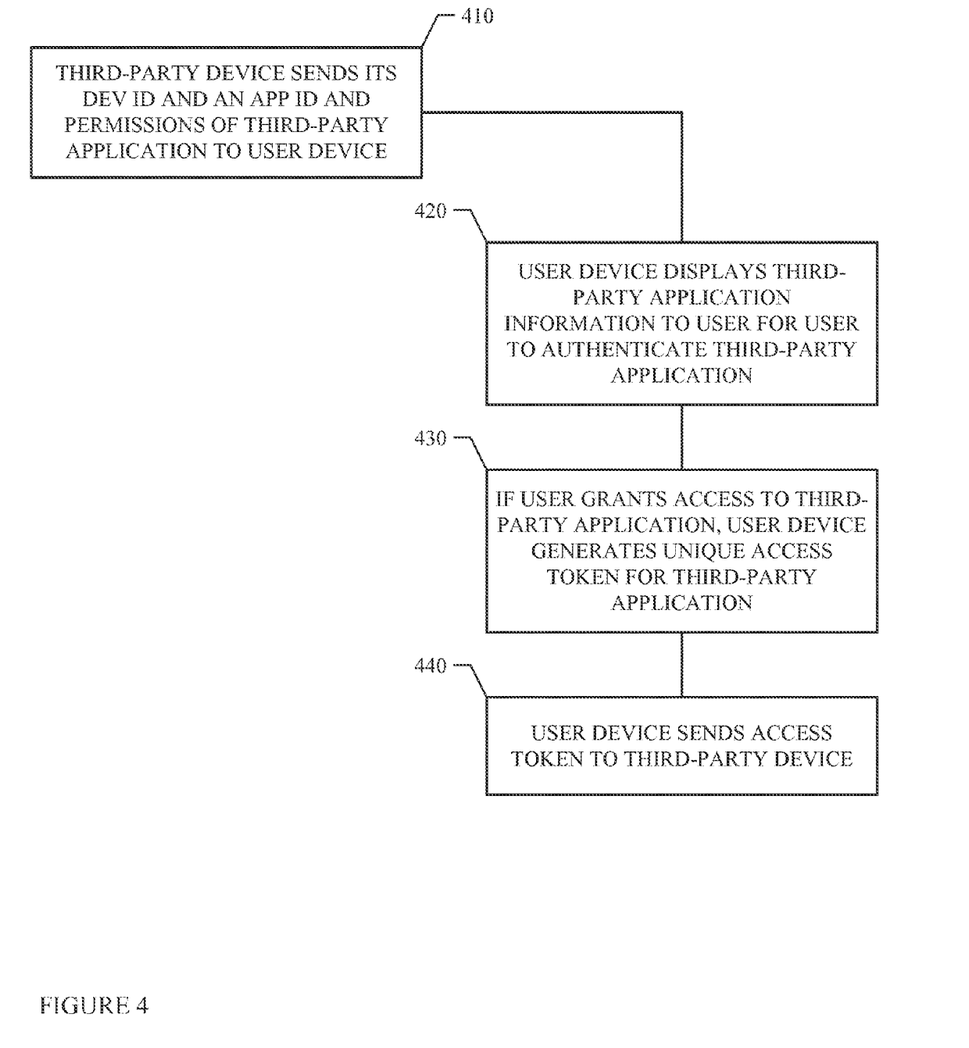
FIG. 4 illustrates an example method for a user to authenticate a software application.

FIG. 4 illustrates an example method for obtaining user permission for a third-party application executing on a third-party device, which corresponds to system 200 illustrated in FIG. 2. In particular embodiments, the method may start at step 410, where a third-party device sends its DEV ID and the APP ID and PERMISSIONS of a third-party application executing on the third-party device to a user device associated with a user. At step 420, the user device may check whether the user has already granted application permission for this specific third-party application, and if not, the user device may ask the user whether he is willing to grant this third-party application access to his information (e.g., as indicated by PERMISSIONS). If the user responds affirmatively (e.g., granting access), at step 430, the user device may generate an access token based on the DEV ID, APP ID, and PERMISSIONS. In particular embodiments, the user's application permission choice for this third-party application, whether affirmative (e.g., granting access) or negative (e.g., denying access), is stored for future reference. At 440, the user device sends the access token, if one is generated, to the third-party device. The third-party application may then perform functions in connection with the user using the access token. The method may end at this point.

Figure 5:
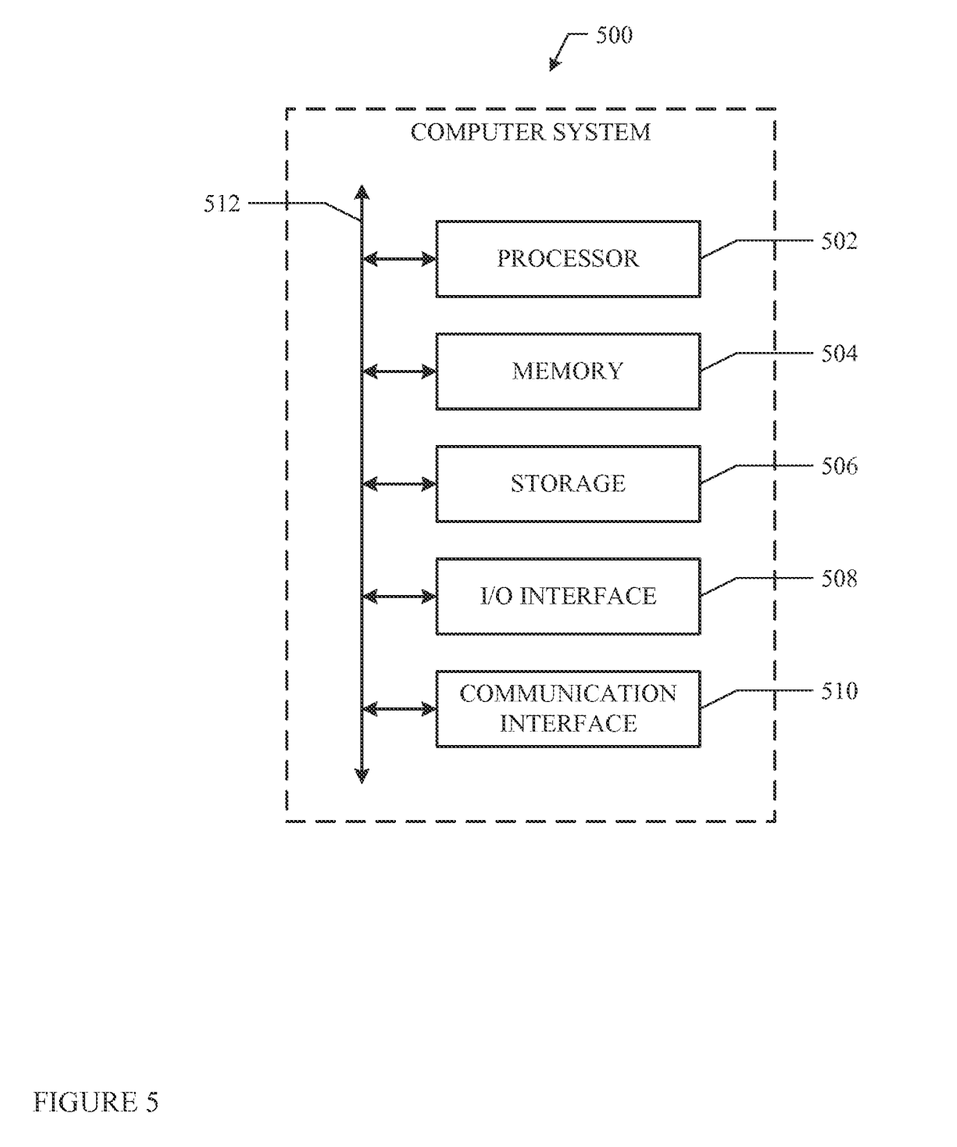
FIG. 5 illustrates an example computing or electronic device.

Particular embodiments may be implemented on one or more computer systems. FIG. 5 illustrates an example computer system 500, which may be used to implement a user device (e.g., user device 120), a third-party device (e.g., third-party device 110), or a server (e.g., server 130). In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such, as for example, a field-programmable gate array (FPGA) or an application-specific IC (ASIC)), a hard disk drive ("HDD"), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a suitable combination of these, where appropriate. This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving, at a first computing device, a request for an access token stored on the first computing device, wherein the request was sent from a software application executing on a second computing device, wherein the request comprises an application token, the application token being generated by the second computing device based on an application identifier and a secret key of the software application, and wherein the access token was generated for a specific software application executing on a specific computing device;
verifying, by the first computing device and based on the application token, that the software application executing on the second computing device is the same as the specific software application and the second computing device is the same as the specific computing device for which the access token was generated; and
in response to receiving a positive verification, sending, by the first computing device, the access token to the second computing device.

2. The method of claim 1, wherein the access token was received at the first computing device from a third computing device, wherein the access token was generated by the third computing device for the specific software application executing on the specific computing device.

3. The method of claim 2, wherein:
the first computing device is associated with a social network;
the third computing device is associated with a user of the social network; and
the second computing device is associated with a second party connected with the social network.

4. The method of claim 3, wherein the access token is stored in connection with the user at the social network.

5. The method of claim 3, further comprising:
receiving, at the first computing device, information associated with the user from the second computing device;
storing, by the first computing device, the information at the social network.

6. The method of claim 2, wherein:
the specific software application has a unique application identifier and a set of permissions;
the specific computing device has a unique device identifier; and
the access token is generated by the third computing device based on the unique application identifier, the set of permissions, and the unique device identifier.

7. The method of claim 6, wherein:
the specific computing device has a radio-frequency identification (RFID) tag; and
a tag identifier of the RFID tag is used as the unique device identifier of the specific computing device.

8. The method of claim 7, wherein:
the third computing device has a RFID reader; and
the third computing device reads the RFID tag of the specific computing device to obtain the unique application identifier of the specific software application and the unique device identifier of the specific computing device.

9. The method of claim 6, wherein:
the specific computing device displays a QR code; and
the QR code is encoded with the unique application identifier of the specific software application and the unique device identifier of the specific computing device.

10. The method of claim 9, wherein:
the third computing device has a QR code reader; and
the third computing device reads the QR code of the specific computing device to obtain the unique application identifier of the specific software application and the unique device identifier of the specific computing device.

11. The method of claim 9, wherein the QR code is further encoded with the set of permissions.

12. The method of claim 2, wherein the third computing device and the second computing device are mobile devices.

13. One or more computer-readable non-transitory storage media embodying software operable when executed by one or more processors to:
receive, at a first computing device, a request for an access token stored on the first computing device, wherein the request was sent from a software application executing on a second computing device, wherein the request comprises an application token, the application token being generated by the second computing device based on an application identifier and a secret key of the software application, and wherein the access token was generated for a specific software application executing on a specific computing device;
verify, by the first computing device and based on the application token, that the software application executing on the second computing device is the same as the specific software application and the second computing device is the same as the specific computing device for which the access token was generated; and
in response to receiving a positive verification, send, by the first computing device, the access token to the second computing device.

14. The media of claim 13, wherein the access token was received at the first computing device from a third computing device, wherein the access token was generated by the third computing device for the specific software application executing on the specific computing device.

15. The media of claim 14, wherein:
the first computing device is associated with a social network;
the third computing device is associated with a user of the social network; and
the second computing device is associated with a second party connected with the social network.

16. The media of claim 15, wherein the access token is stored in connection with the user at the social network.

17. The media of claim 15, further comprising:
receiving, at the first computing device, information associated with the user from the second computing device;
storing, by the first computing device, the information at the social network.

18. The media of claim 14, wherein:
the specific software application has a unique application identifier and a set of permissions;
the specific computing device has a unique device identifier; and
the access token is generated by the third computing device based on the unique application identifier, the set of permissions, and the unique device identifier.

19. A computing device comprising:
one or more processors; and
a memory coupled to the processors comprising instructions executable by the processors, the processors being operable when executing the instructions to:
receive, at the computing device, a request for an access token stored on the computing device, wherein the request was sent from a software application executing on an other computing device, wherein the request comprises an application token, the application token being generated by the second computing device based on an application identifier and a secret key of the software application, and wherein the access token was generated for a specific software application executing on a specific computing device;

verify, by the computing device and based on the application token, that the software application executing on the other computing device is the same as the specific software application and the other computing device is the same as the specific computing device for which the access token was generated; and in response to receiving a positive verification, send, by the computing device, the access token to the other computing device.

20. The media of claim 18, wherein:
the specific computing device has a radio-frequency identification (RFID) tag; and
a tag identifier of the RFID tag is used as the unique device identifier of the specific computing device.

21. The media of claim 20, wherein:
the third computing device has a RFID reader; and
the third computing device reads the RFID tag of the specific computing device to obtain the unique application identifier of the specific software application and the unique device identifier of the specific computing device.

22. The media of claim 18, wherein:
the specific computing device displays a QR code; and
the QR code is encoded with the unique application identifier of the specific software application and the unique device identifier of the specific computing device.

23. The media of claim 22, wherein:
the third computing device has a QR code reader; and
the third computing device reads the QR code of the specific computing device to obtain the unique application identifier of the specific software application and the unique device identifier of the specific computing device.

24. The media of claim 22, wherein the QR code is further encoded with the set of permissions.

25. The media of claim 14, wherein the third computing device and the second computing device are mobile devices.

26. The computing device of claim 19, wherein the access token was received at the first computing device from a third computing device, wherein the access token was generated by the third computing device for the specific software application executing on the specific computing device.

27. The computing device of claim 26, wherein:
the first computing device is associated with a social network;
the third computing device is associated with a user of the social network; and
the second computing device is associated with a second party connected with the social network.

28. The computing device of claim 27, wherein the access token is stored in connection with the user at the social network.

29. The computing device of claim 27, further comprising:
receiving, at the first computing device, information associated with the user from the second computing device;
storing, by the first computing device, the information at the social network.

30. The computing device of claim 26, wherein:
the specific software application has a unique application identifier and a set of permissions;
the specific computing device has a unique device identifier; and
the access token is generated by the third computing device based on the unique application identifier, the set of permissions, and the unique device identifier.

31. The computing device of claim 30, wherein:
the specific computing device has a radio-frequency identification (RFID) tag; and
a tag identifier of the RFID tag is used as the unique device identifier of the specific computing device.

32. The computing device of claim 30, wherein:
the third computing device has a RFID reader; and
the third computing device reads the RFID tag of the specific computing device to obtain the unique application identifier of the specific software application and the unique device identifier of the specific computing device.

33. The computing device of claim 30, wherein:
the specific computing device displays a QR code; and
the QR code is encoded with the unique application identifier of the specific software application and the unique device identifier of the specific computing device.

34. The computing device of claim 33, wherein:
the third computing device has a QR code reader; and
the third computing device reads the QR code of the specific computing device to obtain the unique application identifier of the specific software application and the unique device identifier of the specific computing device.

35. The computing device of claim 33, wherein the QR code is further encoded with the set of permissions.

36. The computing device of claim 26, wherein the third computing device and the second computing device are mobile devices.

* * * * *